3,785,942
PROCESS FOR THE RECOVERY OF MERCURY
FROM WASTE SOLIDS
Gordon A. Carlson, New Martinsville, W. Va., assignor
  to PPG Industries, Inc., Pittsburgh, Pa.
No Drawing. Continuation-in-part of application Ser. No.
  806,204, Mar. 11, 1969, now Patent No. 3,647,653.
  This application Mar. 8, 1972, Ser. No. 232,769
       Int. Cl. C01b 7/06; C01d 1/08; C22b 43/00
U.S. Cl. 204—99                                   6 Claims

ABSTRACT OF THE DISCLOSURE

Mercury is recovered from electrolytic cell caustic filter solids by treatment with a brine containing elemental chlorine in an amount sufficient to solubilize the mercury. The mercury containing brine can then be returned to the electrolytic cell.

---

This is a continuation-in-part application of U.S. Ser. No. 806,204, filed Mar. 11, 1969, now U.S. Pat. No. 3,647,653.

This invention relates to a process for recovering elemental mercury from filter solids and particularly from mercury electrolytic cell caustic filter solids which are, for the most part, a mixture of elemental mercury and the material used to precoat the filter which filter removes the mercury from the caustic.

In the operation of a mercury electrolytic cell, the product sodium hydroxide or potassium hydroxide solution is filtered to remove elemental mercury which has been released from the cell. Mercury is also deposited on the graphite or carbon cathode as disclosed in my copending application (supra). Although the amount of mercury is small, it has been recently discovered that even minor amounts are harmful to animals and fish and probably humans so that it is necessary to recover this mercury. The filter solids also contain the filter pre-coat such as activated carbon or cellulose.

It has now been discovered that elemental mercury can be removed from solids, and particularly mercury electrolytic cell caustic filter solids, by the method for removing mercury from cell cathodes disclosed in my copending application (supra). This method comprises treating the solids with a brine, having a pH of less than about 10, containing elemental chlorine and chloride ion. This results in the solubilization of the mercury into the brine and the brine can then be returned to the mercury electrolytic cell. It is believed that the elemental chlorine serves to oxidize the mercury metal to the mercury ion and that the choride ion converts the mercury ion to a mercury chloride complex $HgCl_4^=$ which is stable in the brine and soluble so that the brine can be returned to the mercury electrolytic cell.

For best results, the pH of the brine should be adjusted to below about 7 and most preferably between about 2 and 3 as the elemental chlorine will more easily react with the mercury metal at low pH's than at high pH's where the chlorine becomes unavailable as it reacts with the basic brine.

The temperature of the brine can be between about room temperature and 200° F. or more but should not be so high that the elemental chlorine escapes. A preferred temperature range for the brine is between about 150° F. and about 180° F. wherein the reaction rate between the elemental chlorine and mercury metal is optimum but not so high that elemental chlorine escapes from the brine.

Any of the commonly employed sodium chloride or potassium chloride brines can be employed which customarily contain at least about 0.1 and preferably 1 to 3 grams per liter elemental chlorine, and between about 10 and about 200 and preferably between about 90 and about 200 grams per liter chloride ion, as the mercury chloride complex is more stable in high chloride containing brines. The amount of elemental chlorine in the solution will depend upon the temperature and generally the brine will have at least about 160 grams per liter chloride ion.

The elemental chlorine normally becomes expended depending upon the amount of elemental mercury present which must be oxidized so that more chlorine may be required to be added to the brine particularly in a batch process.

The process can be conducted continuously by passing the brine through a bed of mercury containing solids as in the operation of the mercury electrolytic cell brine treatment process or a separate tank can be set aside wherein the solids can be treated and then the resultant brine recycled to the mercury electrolytic cell.

The following examples will serve to illustrate the invention and preferred embodiments thereof. All percentages in said examples and elsewhere in this specification are by weight.

EXAMPLE I

To 36.2 grams of elemental mercury-activated carbon containing solids recovered from a mercury electrolytic cell caustic filter and containing 59 percent by weight elemental mercury was added 2 liters of 300 grams per liter sodium chloride brine and the mixture was adjusted to a pH of between 2 and 3 by the addition of concentrated hydrochloric acid. The mixture was stirred for 80 hours at a temperature of between 165 and 175° F. with chlorine being bubbled into the mixture at a rate of 0.1 gram per minute. The mixture was then filtered and the solids water washed. The solids were analyzed and found to contain only 0.0066 percent mercury metal.

EXAMPLE II

To 20.1 grams of elemental mercury-activated carbon containing solids recovered from the filters used to filter mercury electrolytic cell caustic and containing 16 percent by weight elemental mercury was added two liters of 300 grams per liter sodium chloride brine. The pH was adjusted to between 2 and 3 by the addition of concentrated hydrochloric acid. The mixture was then stirred for 120 hours at a temperature of between 170 and 180° F. with chlorine being bubbled into the mixture at a rate of 0.1 gram per minute. The mixture was then filtered and the solids water washed. The solids were found to contain only 0.009 percent mercury.

EXAMPLE III

To 34 grams of elemental mercury cellulose containing solids recovered from a mercury electrolytic cell caustic filter, and containing 19 percent by weight elemental mercury, was added 2 liters of 290 grams per liter sodium chloride brine and the mixture was adjusted to a pH of 2.7 by the addition of concentrated hydrochloric acid. The mixture was stirred for 91 hours at a temperature of 100° F. while chlorine gas was bubbled into the mixture at a rate of 0.2 grams per minute. The mixture was then filtered and the solids water washed. The solids were analyzed and found to contain only 0.01 percent mercury metal.

Although the invention has been described with reference to certain specific details of preferred embodiments, it is not intended to thereby limit the scope of the invention except insofar as these details are included in the accompanying claims.

I claim:
1. A process for removing elemental mercury from filter solids of a mercury electrolytic cell comprising treating said solids with sodium chloride or potassium chloride brine having a pH less than about 10, said brine containing elemental chlorine in an amount sufficient to solubilize the mercury.

2. A process for removing elemental mercury from mercury electrolytic cell sodium or potassium hydroxide filter solids, comprising treating the solids with a sodium chloride or potassium chloride brine having a pH below about 7 and containing at least about 0.1 gram per liter elemental chlorine and between about 90 and about 200 grams per liter chloride ion to solubilize the mercury, and returning the mercury containing brine to a mercury electrolytic cell.

3. The process of claim 2 wherein the pH of the brine is adjusted to between about 2 and about 3.

4. The process of claim 2 wherein the brine contains at least about 160 grams per liter chloride ion.

5. The process of claim 2 wherein the brine contains at least about 1 to 3 grams per liter elemental chlorine.

6. The process of claim 2 wherein the temperature of the brine is between about 150° F. and about 180° F.

References Cited
UNITED STATES PATENTS 3,213,006  10/1965  Crain et al. ---------- 204—99
3,627,482  12/1971  Olson et al. ---------- 75—121

JOHN H. MACK, Primary Examiner

R. L. ANDREWS, Assistant Examiner

U.S. Cl. X.R.

204—128, 130; 75—121